Aug. 26, 1924.
J. R. PEIRCE
1,506,383
PERFORATION READING INSTRUMENTALITIES
Filed June 7, 1922    7 Sheets-Sheet 1
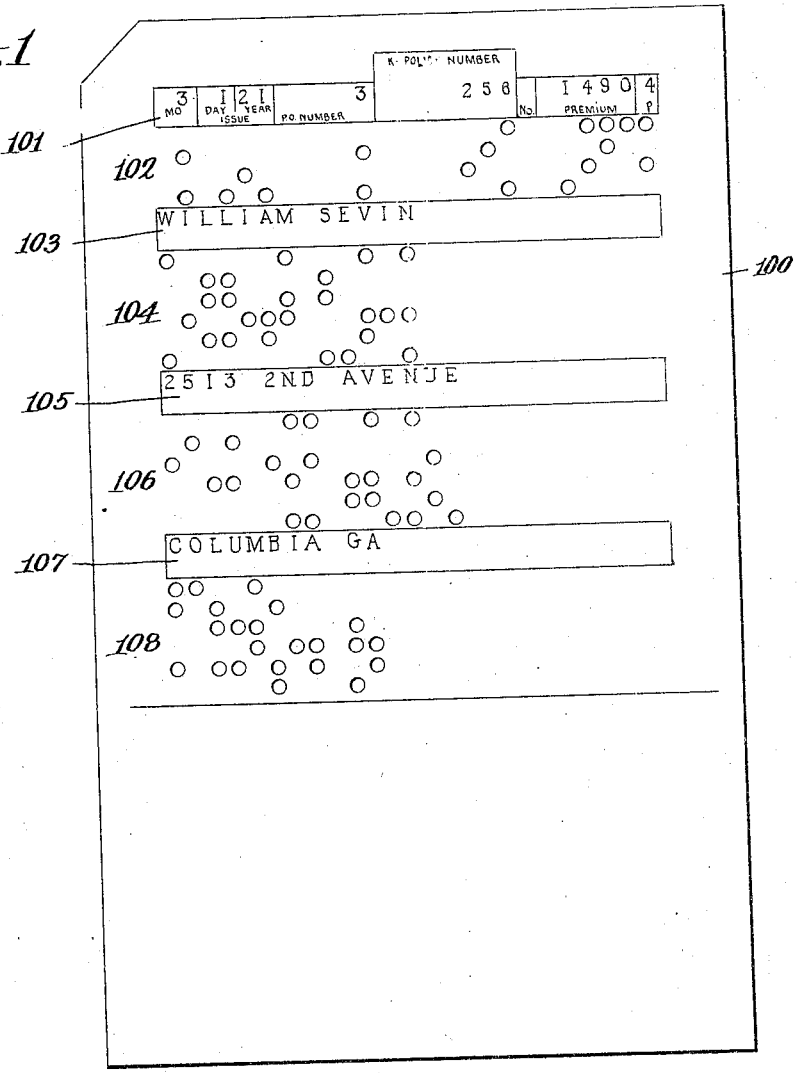
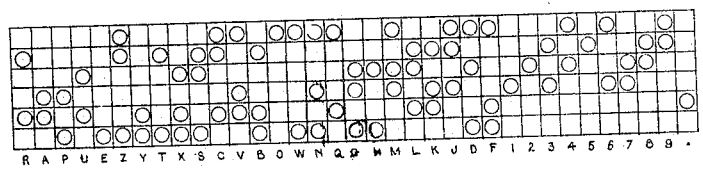
Inventor
John Royden Peirce
By his Attorneys
Cooper Kerr & Dunham

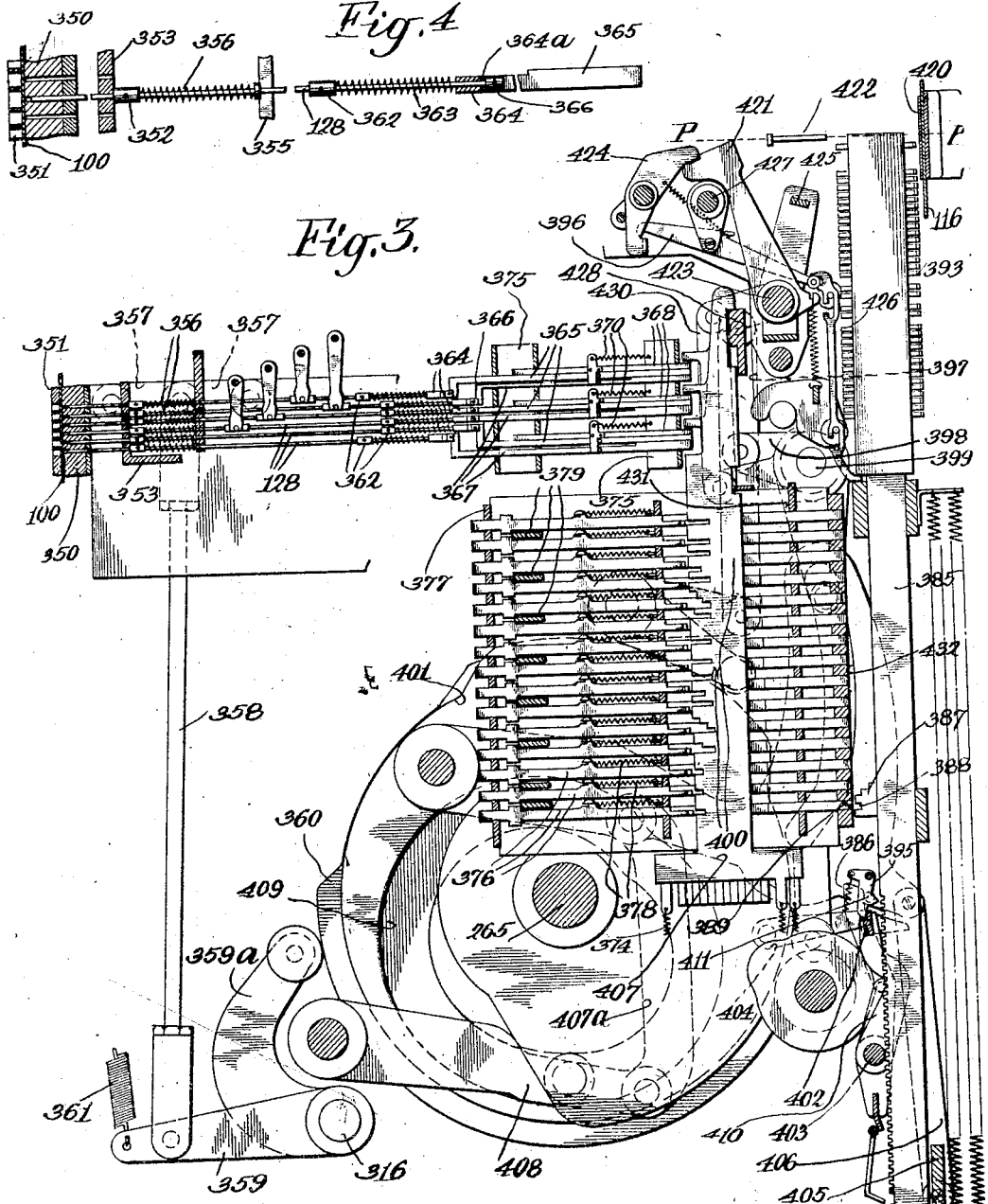

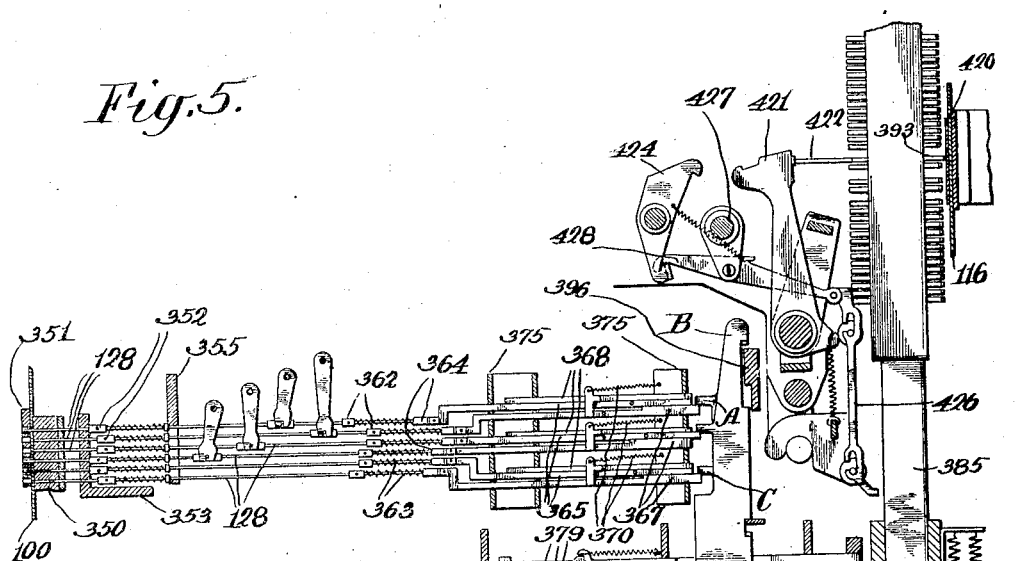
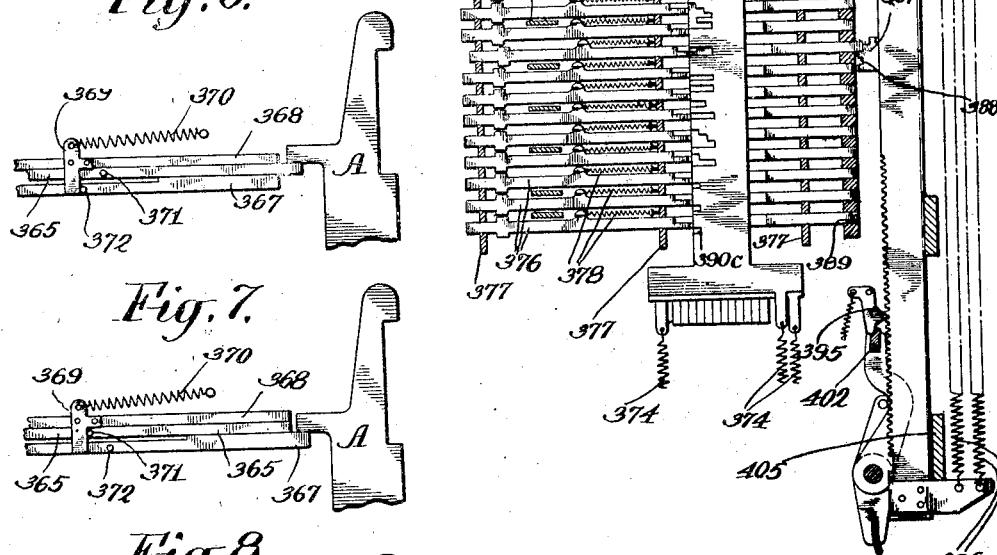
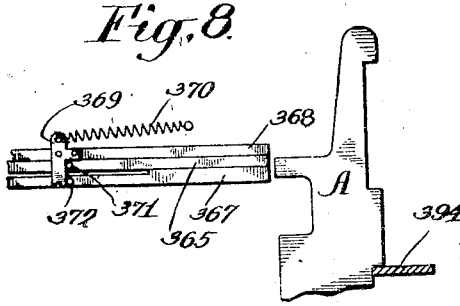

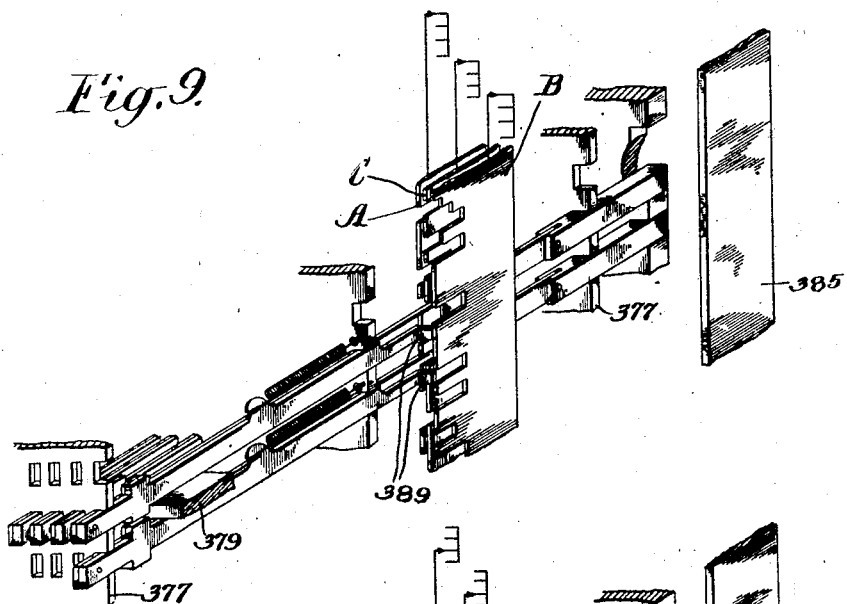
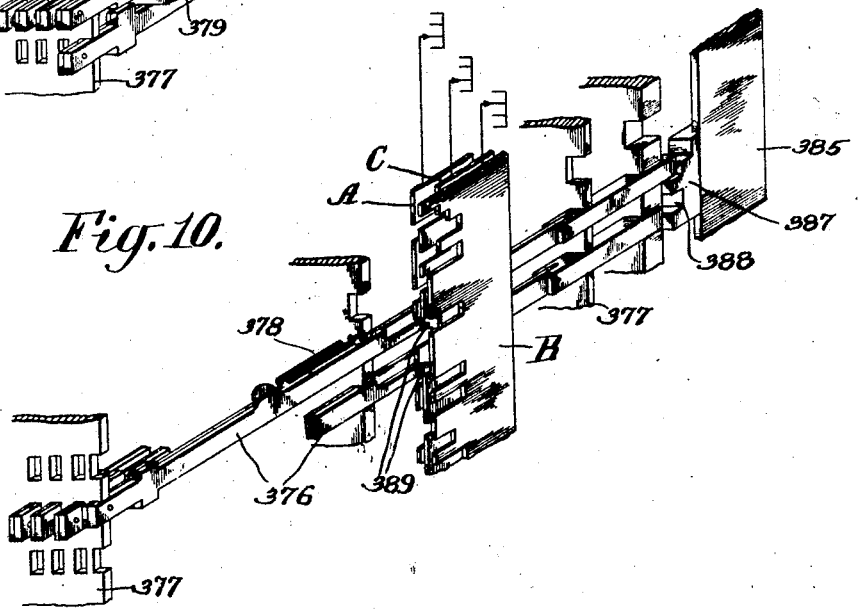

Aug. 26, 1924.

J. R. PEIRCE 1,506,383

PERFORATION READING INSTRUMENTALITIES

Filed June 7, 1922    7 Sheets-Sheet 5

Inventor
John Royden Peirce
By his Attorneys
Cooper Kerr & Dunham

Aug. 26, 1924.

J. R. PEIRCE 1,506,383

PERFORATION READING INSTRUMENTALITIES

Filed June 7, 1922    7 Sheets-Sheet 7

Inventor
John Royden Peirce
By his Attorneys
Cooper Kerr & Dunham

Patented Aug. 26, 1924.

1,506,383

UNITED STATES PATENT OFFICE.

JOHN ROYDEN PEIRCE, OF NEW YORK, N. Y., ASSIGNOR TO COMPUTING-TABULATING-RECORDING CO., OF NEW YORK, N. Y., A CORPORATION OF NEW YORK.

PERFORATION-READING INSTRUMENTALITIES.

Original application filed June 7, 1922, Serial No. 566,448. Divided and this application filed June 7, 1922. Serial No. 566,449.

*To all whom it may concern:*

Be it known that I, JOHN ROYDEN PEIRCE, a citizen of the United States of America, residing at New York, in the county of New York and State of New York, have invented certain new and useful Improvements in Perforation-Reading Instrumentalities, of which the following is a full, clear, and exact description.

This invention relates to machines controlled by perforated record cards or sheets and has for one of its principal objects to provide novel combinations of instrumentalities to sense or read the perforations of the record.

Another object is to decrease the number of working parts of such machines.

A further object is to render such machines more compact. Other objects and advantages will appear as the invention is hereinafter disclosed.

Referring to the drawings which illustrate what I now consider to be a preferred form of the invention, Fig. 1 shows a record sheet, in the form of a card, of the type adapted to be employed in controlling the machine.

Fig. 2 is a diagrammatic view illustrating a preferred code of combination arrangements of perforations.

Fig. 3 is a detail sectional view of a machine embodying the invention.

Fig. 4 is a detail sectional view illustrating one of the perforation-sensing elements and a stop member controlled thereby.

Fig. 5 is a view similar to Fig. 3 but with some of the parts omitted and others shown in an actuated position.

Figs. 6, 7 and 8 are fragmentary detail elevations showing various positions of a comb element as determined by different set-ups of stop members.

Figs. 9 and 10 are fragmentary perspective views illustrating in normal and actuated positions, respectively, the relationship between certain feeler bars, combs and type carriers.

Figure 11:
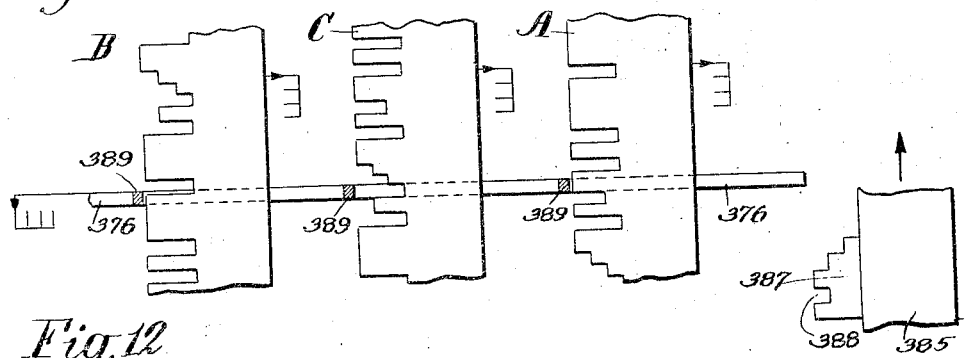
Figs. 11 to 14 are diagrammatic views illustrating certain combinational relationships between parts such as those shown in Figs. 9 and 10.

While the novel form of record sheets employed and the novel system of perforating the same are embodied and claimed in separate companion applications entitled "Record sheets and apparatus controlled thereby" and "Method of and apparatus for perforating record sheets;" I shall somewhat generally describe such sheets and system in order to facilitate disclosure of the present invention.

Referring to Fig. 1 it will be seen that the record sheet is there shown in the form of a card 100 having one or more fields 102, 104, etc. A description of one of these fields, say the field 106, will suffice in the present application. This field consists of a number of rows or vertical columns of hole spaces. Each of these columns of hole spaces is adapted to be perforated to form various combination arrangements of holes or perforations for each row or column. Such a card is adapted to be fed to a machine provided with rows or columns of perforation-sensing or reading devices which are operated in accordance with the particular combination arrangement of perforations in any row of hole spaces on the card represents a character corresponding to that combination arrangement. And each card column must have a sufficient number of hole spaces to accommodate a number of different combination arrangement of holes sufficient to cover the range of characters to be dealt with. In the present case I desire to effect records of any of the letters of the alphabet and any of the digits and at least one punctuation mark. This necessitates the use of at least thirty-five different combination arrangements of perforations or holes and each card column or row of hole spaces must be capable of accommodating any of these thirty-five different combination arrangements.

I have devised a card and system of perforating the same whereby the number of hole spaces employed is the theoretical minimum number to accommodate the various required combination arrangements of perforations. I employ six hole spaces in each row or vertical column where it is desired to represent any of the letters of the alphabet and the digits. With six hole spaces it is possible to secure sixty-three different combination arrangements of perforations. This number will suffice to provide distinct records for the various letters of the alphabet and the digits and punctuation and other characters. Five hole spaces will not suffice to represent the various letters of the alphabet and the digits because the maximum possible number of different combination arrangements of holes in a five-space column or row is thirty-one.

In Fig. 2 I have shown a preferred code. Each of the squares represents a hole space and each of the circles represents a hole or perforation. The combination arrangement of holes in any vertical row of hole spaces corresponds to or represents the character indicated at the bottom of that row or column. Thus, the character "R" is represented by two perforations, one in the second hole space and the other in the fifth hole space. The character "B" is represented by three perforations, one in the second hole space, another in the fifth hole space and the other in the sixth hole space, and so on. Each of thirty-five different characters is represented by a corresponding one of thirty-five different combination arrangements of perforations. It will be understood, of course, that any of the various combination arrangements of perforations may be provided in any of the vertical columns of the field of the card. By reference to Fig. 1 it will be seen that various combination arrangements of holes there illustrated, in the field 104, represent the letters making up the name "William Sevin."

Referring again to Fig. 2 it will be noted that no more than three holes are employed to indicate or represent any of the desired characters. Combination arrangements of four, five or six perforations might be employed but I prefer to exhaust the number of combination arrangements of perforations taken one at a time and the number of combination arrangements of perforations taken two at a time, etc., before utilizing higher combination arrangements of holes.

In other words I not only employ the theoretical minimum number (six) of hole spaces to represent different characters, including the letters of the alphabet and other characters, but the maximum number (three) of holes employed at any one time to represent a character is the theoretical minimum for that hole space system. Furthermore the total number of perforations employed to represent all of the various characters (thirty-five in the present case) is the theoretical minimum number (seventy-eight) for the hole space system employed. It necessarily follows that the average number of holes employed to represent the various characters is the theoretical minimum number for the hole space system employed. At this point it may be further pointed out that characters which are apt to occur most frequently are represented by single perforations, those occurring less frequently, by two perforations, and so on.

It will be noted further that whereas all six hole spaces are employed to represent various letters, only the four upper hole spaces are employed to represent the digits and the maximum number of holes to represent any digit is two.

The present application relates particularly to machines adapted to receive record sheets such as the card above described and to be controlled thereby. Such machines may be employed for various purposes among which is the production of records corresponding to the combination arrangements of perforations in the record sheets. In other words, while the machine selected for the purpose of illustration herein is particularly adapted for effecting a record or records, by printing, embossing, perforating or otherwise, such record to correspond to the combination arrangement of holes in the controlling sheet or card, certain features of the invention are capable of other uses.

*Perforation-sensing elements.*

The machine herein disclosed and forming the subject matter of the present application comprises a plurality of rows or columns of perforation-sensing or reading elements. It will be understood that there is a row of such elements for each row or column of hole spaces provided in the card or cards which control the machine. In view of the fact that each of these rows or columns of perforation-sensing elements and the instrumentalities operated or controlled thereby are or may be substantially identical to each of the other rows and the instrumentalities operated or controlled thereby, a specific description of one set will suffice for all.

Referring to Fig. 3 it will be seen that the row or column of perforation sensing elements there illustrated consists of six pins 128. In order to guide the pins 128 through the card, a perforated guide plate 350 is provided. After the particular field of the card has been read or sensed the pins are withdrawn from the card and the latter removed. The mechanism for moving the card is fully disclosed in my first mentioned application and need not be further described herein. The pins 128 extend through pin guide 350 and are provided with collars 352 secured thereto which are pressed against the actuating and restoring frame 353 by springs 356. The other ends of the springs 356 bear against collars slidably mounted on the pins 128 and which seat against a stationary guide plate 355.

The advance of the pins 128 into contact with the card 100 is accomplished by moving the frame 353 forwardly, permitting the springs 356 to push forwardly those of the pins 128 which align with perforations in the card.

It should be borne in mind that the frame 353 is adapted to advance a bank or series of sets (or vertical views) of elements 128. The means for moving the frame 353 at the proper time in the cycle of operation will be hereinafter more specifically mentioned.

Each of the pins 128 (see Figs. 3 and 4) extends rearwardly from the plate 355 and has secured thereto a collar 362 against which a compression spring 363 abuts. The rear end of each pin 128 is connected to a corresponding one of six movable stop members or pin bars 365, 367. The first, third and fifth pins 128 are each connected to a corresponding one of three stop members or pin bars 365 while the second, fourth and sixth pins 128 are each connected to a corresponding one of three pin bars 367. The connection between each pin and its corresponding pin bar comprises a lug 364ª secured to the pin bar and through which the pin 128 extends and slides, and a collar 366 secured to the pin 128 and adapted to move the pin bar forwardly with the pin. A corresponding one of compression springs 363 abuts each collar 362 and each slidable collar 364 thus permitting the pins 128 to be restored to rearward position prior to the restoration of the stop members or pin bars 365, 367.

Referring now to Figs. 3, 5, 6, 7 and 8 it will be seen that there are more stop members (or pin bars) than there are pins 128. Besides the six pin bars 365, 367 there are provided three auxiliary pin bars 368. Each of these three auxiliary pin bars 368 is superimposed upon a corresponding one of the pin bars 365 and each bar 368 carries a lug 369 to which a corresponding one of three tension springs 370 is connected. Each of the lugs 369 extends in the path of forward movement of a corresponding pair of three pairs of pins 371—372, a pin 371 of each pair being provided on a corresponding one of pin bars 365 and the other pin 372 of each pair being provided on a corresponding one of the bars 367. The various pin bars are slidably mounted in a pin bar frame 375 to which the rear ends of springs 370 are connected.

Fig. 3 shows the normal position of pins 128 and pin bars with no pins advanced. The rear ends of the nine pin bars extend into the path of and control a plurality of combs A, B and C. These combs are individually slidable in a direction at right angles to the direction of movement of the pins and pin bars and each is provided with a laterally extending lug adapted to cooperate with the three groups of pin bars. In the normal position of parts with no pins actuated, illustrated in Fig. 3, the lug on the comb A overlies the top pin bar 368, the lug on the comb B overlies the second pin bar 368 and the lug on the comb C overlies the lower pin bar 368.

Referring now to Fig. 6, a condition is here shown in which the comb A has descended one step. This is the result of forward movement of the second pin 128 and its connected pin bar 367, thereby causing the pin 372 of the latter to move the cooperating lug 369 and its pin bar 368 to move forwardly (or to the left). Under these conditions the pin bar 365 remains in normal position and arrests or limits downward movement of the comb A to a drop of one step. This condition corresponds to a single perforation in the second hole space in the card which represents the character "5" (see Fig. 2).

If the upper pin 128 moves forward alone, the parts assume the position shown in Fig. 7. Here the pin bar 365 has moved forward and bar 367 remained stationary. The pin 371 engages the lug 369 so that the pin bars 368 and 365 move together forwardly. This allows the comb A to drop two steps and corresponds to a single perforation in the first (upper) hole space of the card, representing the character "0."

In Fig. 8, both of the two upper pins 128 have moved forward causing all three of the corresponding pin bars 368, 365 and 367 to move forward permitting the comb A to drop its fullest extent which is limited by a fixed or stationary stop member 394 adapted to extend into a cut-out portion on each of the combs.

The condition illustrated in Fig. 8 results from forward movement of the first and second pins 128 in response to first and second perforations in a card, representing the character "9."

Thus the comb A is adapted to occupy four different positions in accordance with the operation of the two upper pins 128. When neither of these pins moves forward, the comb A occupies the position shown in Fig. 3; when the second pin 128 moves forward and the first pin remains in normal position the comb A occupies the second position; when the first pin is operated to the exclusion of the second, the comb A occupies the third position; and when both first and second pins are actuated the comb occupies the fourth position. Similarly the comb B is adapted to occupy any one of four positions dependent upon the operation of the third and fourth pins, and the comb C is adapted to occupy any one of four positions dependent upon the operation of the two lowest pins, i. e., the fifth and sixth pins 128.

It should be noted that sixty-three different combinations of the pins 128 may be operated. There are sixty-three corresponding different combinations of pin bars 368, 365, 367, operated one, two, three, four, five and six at a time. And there are sixty-three different combinations of comb positions (excluding the one in which all three combs are in normal position) each determined by a corresponding one of the sixty-three combinations of actuated pin bars. In the present machine I do not employ all of the possible combinations but only thirty-five of them in accordance with the various combination arrangements of perforations illustrated in the code chart shown in Fig. 2.

The combs A, B and C are aided in their descent by the pull or bias imparted to them by tension springs 374. Disposed below the pin bar assembly is a group of individually movable feeler members 376. Each of these members or feeler bars 376 is slidably mounted in a frame 377 and biased to the right (Figs. 3 and 5) by a corresponding one of springs 378 secured at opposite ends to the feeler bars and frame 377. Bails 379 co-operate with shoulders on the various feeler bars to move the latter to, and hold them in, the position shown in Fig. 3 in which their right hand ends are substantially flush with one of the plates 377.

When the bails 379 move to the right and release the feeler bars (see Fig. 5) the advance of the latter is controlled by the combs A, B and C, which in turn are controlled by the pin bars and pins as previously described. In the machine disclosed the combs are provided with various combinations of comb slots so as not only to select which one of the feeler bars shall be permitted to advance (to the right) in accordance with the combination-comb-position, but also the extent of advance of the particular feeler bar. In order to explain this control more fully I shall first refer to one form of record effecting means.

A type carrier 385 is mounted for vertical sliding movement in suitable guides. This type carrier (there is one for each set of pins, pin bars, combs and feeler bars) is provided with a stepped shoulder 387 having three upper steps and a lower notch 388. When the type carrier is in lower position the notch 388 aligns with the lowermost feeler bar 376. This lower notch is utilized to prevent elevation of the type carrier 385 when there is no perforation in the controlling column of the card. Under these conditions a lug 389 on the lowermost feeler bar is adapted to advance into the then registering notches 390° in the combs A, B and C. If any of these combs has dropped one or more of the notches 390° will be out of alignment with the lug 389 and the lowermost feeler bar will be prevented from advancing into the notch 388 to lock the type carrier.

The type carrier 385 is biased to upper position by tension springs 386 and when released will assume one of thirty-five different positions depending upon which of the upper fourteen feeler bars 376 has advanced and the extent of advance of that feeler bar. In each of these thirty-five different positions, a corresponding one of thirty-five type bars 393 is brought to the printing plane P—P. Each of these type bars is adapted to print a character corresponding to the combination arrangement of card perforations which causes that particular type bar to be positioned at the printing plane.

It will be noted that each of the feeler bars 376 (see Figs. 9 and 10) is provided with a lug 389 which extends across all three combs A, B and C. To facilitate explanation I shall now refer to Figs. 11 to 14 inclusive which illustrate diagrammatically but clearly certain of the various combination controls. In these last mentioned views the combs A, B and C are placed in one plane and the lug 389 on each feeler bar is shown as three lugs.

I shall now explain the relative position of parts to effect recording of the characters "V" "N" and "6." The recording of each of these three characters is determined by the seventh feeler bar 376 (counting from the top) and this is the feeler bar illustrated in Figs. 11 to 14.

In Fig. 11 none of the combs A, B and C have dropped. This is the normal or "no-perforation" position of the combs. In this condition the lug 389 on the feeler bar will abut the unnotched edge of the B comb and consequently the feeler bar will not advance into the path of the stepped stop 387 of the type carrier. As previously explained the lowermost feeler bar will prevent elevation of the type carrier at this time.

Figure 12:
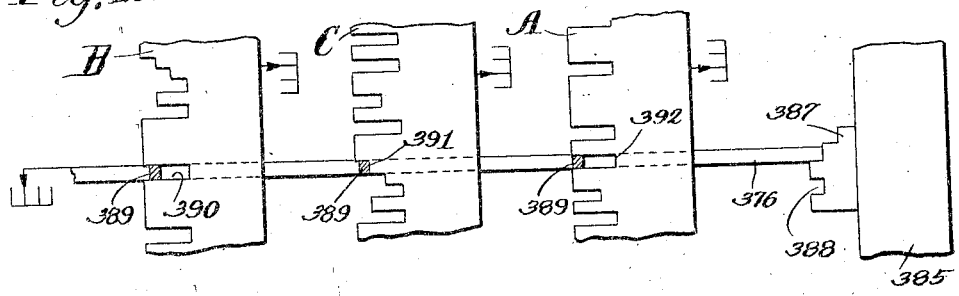

Fig. 12 shows a condition in which the B comb has lowered one step, the C comb two steps, and the A comb two steps. This is indicated by the arrows and is determined by the combination of arrangements of perforations representing the character "V" (see Fig. 2). In other words the first, fourth and fifth pins 128 will have advanced and pin bars and combs will have assumed the position shown in Fig. 5. In this position of combs (Fig. 12) a deep notch 390 on the B comb aligns with the lug 389, a shallow notch 391 on the C comb aligns with the same lug 389, and a medium depth notch 392 on the A comb aligns with said lug 389. The feeler bar therefore advances one step as shown (Fig. 12) and engages the first step on the shoulder 387, when the type carrier is permitted to be elevated, placing the "V" type 393 at the printing plane P—P.

Figure 13:
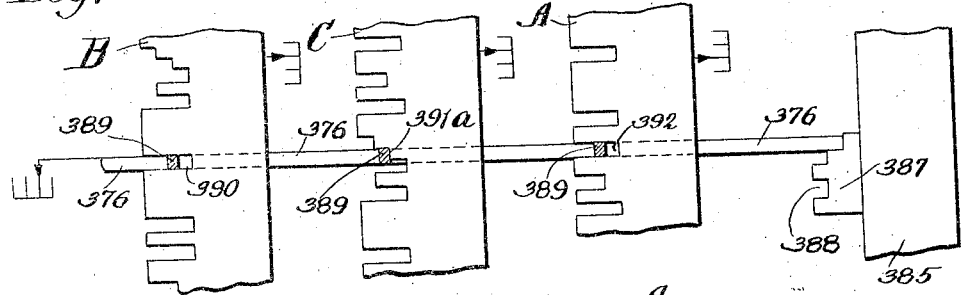

When the first, fourth and sixth pins 128 advance, in accordance with a combination arrangement of perforations representing the character "N," the combs assume the positions shown in Fig. 13. Here the B and C combs have each dropped one step and the A comb two steps. The B and A combs are in the same position as in Fig. 12 but the C comb is in a different position in which it presents a medium depth notch 391$^a$ to the lug 389. This permits the feeler bar 376 to advance two spaces from normal position, stopping the stepped stop 387 on the second step. This determines a position of the type carrier in which the type slug carrying the letter "N" is presented at the printing plane P—P.

Figure 14:
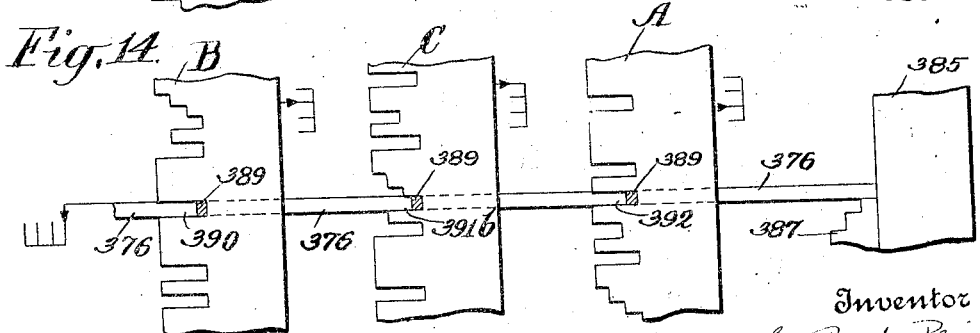

Fig. 14 represents the position assumed when a combination arrangement of perforations representing the number "6" is presented to the perforation-sensing elements 128. The first and fourth pins 128 respond to these perforations and cause the pin bars to be so set as to determine that position of the combs illustrated in the last named figure. Here the B and A combs are in the same position as in Fig. 13 but the C comb is in normal position. Three deep notches 390, 391$^b$ and 392 on the B, C and A combs respectively, are now presented to the lug 389 and the pin bar is permitted to advance to extend into the path of the top step of the stepped abutment. The type carrier 385 will now be stopped in such position as to present a type slug carrying the number "6" at the printing plane P—P.

The relative positions of parts to set the other thirty-two different type slugs 393 at the printing plane P—P, in accordance with the particular combination arrangement of perforations need not be specifically described. Suffice it to say that the combs A, B and C are notched throughout their entire length with varying depth notches to cooperate with the various feeler bars. Each feeler bar carries a proper lug 389 which extends across the three combs and the combinations of positions of the comb notches and their depth determine the differential advance of the feeler bars and thereby determine the extent of elevation of the type carrier 385. It will be seen that the extent of elevation of the carrier 385 (and therefore the selection of the type slugs) is controlled by two factors. The first factor is the position of the particular feeler bar selected, with respect to the remaining feeler bars. The other factor is the extent of advance of the particular feeler bar selected.

As stated above, it should be borne in mind that Figs. 11 to 14 are largely diagrammatic and do not correctly illustrate the specific construction and relation of parts. Instead of the A, B and C combs lying in the same plane they are mounted as indicated in Figs. 9 and 10, and instead of three lugs 389 on each feeler bar there is but one such lug on each feeler bar, which lug extends across all three combs.

The six pins 128, the nine pin bars, the three combs, the fifteen feeler bars and the type carrier, shown in Fig. 3 constitutes a set of instrumentalities for sensing any of thirty-five different combination arrangements of perforations in a card column and for effecting a printed record (at P—P) of the character corresponding to the particular combination arrangement sensed. It being understood that each field on a card 100 (Fig. 1) comprises a plurality of vertical columns of hole spaces it will be appreciated that a bank or banks of sets of instrumentalities (128, 365, 367, 368, A, B, C, 376 and 385) would be provided in the actual machine. As previously stated, each of such sets would be, or may be, identical to the set shown in Fig. 5 so that further illustration in the present case would constitute surplusage. A complete bank of sets of such instrumentalities is provided with certain controlling and actuating devices, common to the entire bank. Thus a bank of pins 128 are released and restored by a common movable frame member 353; the sets of combs, each set comprising the combs A, B and C, are released and restored by a common movable bail 396; the sets of feeler bars, each set consisting of fifteen bars, are released and restored by a common set of movable bails 379; and the sets of type carriers are released and restored by a common movable bail 405. Devices are also provided for causing operation of the type slugs after they have been positioned at the printing plane P—P.

These various last mentioned instrumentalities are operated in the following sequence (see Figs. 3 and 5). When a card 100 has been properly presented, between the members 350 and 351; the frame 353 then moves to the left, the comb bail 396 then permits the combs to drop; the feeler bar bails 379 then move to the right; the type bar bail 405 then releases the type carriers; and the type hammers 421 are then released to impel the type slugs; locking pawls 395 then operate to hold the type carriers against further elevation than that determined by the advanced feeler bars. After the combs have taken their positions determined by the stop members, or pin bars, the frame 353 may be restored to the right awaiting the next card 100. After the type carriers have been set in accordance with the feeler bar selected, and while said type carriers are being held in such positions by the pawls 395, the combs may be restored to normal position by elevation of the bail 396 after the feeler bars have been restored to normal position by the bails 379. At a proper time after the printing has been effected the bail 405 restores the type carriers to normal position. A new card may then be presented and read and so on.

So far as comprehension of the present invention is concerned, a disclosure of timing and operating mechanism for performing the various above described sequential release and restoring operations is not necessary. In fact, so far as this application is concerned it might be assumed that these operations are performed manually in the proper sequence. However, I shall describe more or less generally some of the mechanism employed in a complete machine. For a more specific and detailed disclosure of such mechanism reference is hereby made to my copending application Serial No. 566,448, filed June 7, 1922, entitled "Record sheets and apparatus controlled thereby" of which the present application is a division. This last mentioned copending application also illustrates a bank of sets of instrumentalities, of which one set is shown in Fig. 5 of the present application.

Calling attention to Fig. 3, I shall now describe the mechanism for operating the frame 353. Forward movement of the frame 353 is secured by toggle levers 357 mounted upon the sides of the frame and having a link 358 extending to an arm 359 fixed to a shaft 316 and having a follower 359ª cooperating with a cam 360 on shaft 265. The toggle is broken, and the pins 128 released for advance, by means of a spring 361. The restoration of the frame 353, to restore the pins 128 to normal position, is effected by means of the cam 360.

The comb bail 396 is actuated by links 397 from crank arms 398 on shaft 399. Shaft 399 is in turn actuated by a linkage 400 which extends down outside of the main frame of the machine into cooperation with a cam 401 on the shaft 265.

The pawls 395, one for each of the type carriers, are adapted to cooperate with the notches shown on the type carriers to hold each type carrier down, against the action of the springs 386. At the proper time in the cycle a latch-control bail 402 fixed on a shaft 403 is actuated to permit the latches to engage the type carriers under the influence of their springs. The operating means for the shaft 403 will be described hereinafter.

Type bars 385 are restored in downward direction after the printing operation by the restoring bail 405. This bail is actuated by a link 406 connected to a rocker arm 407 having a depending link 407ª connected to a pivoted arm 408 having a follower cooperating with an internal cam 409 on the shaft 265. Prior to the restoration of the type bars, the latches 395 are released. This is effected by rocking the shaft 403 which carrier an arm 410 carrying a pin adapted to be engaged by a pivoted latch 404. Downward movement of the arm 407 causes the pin 411 carried thereby to engage and rock the arm 410 counter-clockwise, thereby releasing the latches 395 from the type carriers. Thereafter the latch 404 engages the pin on the arm 410 and prevents relatching of the latches 395 until a second pin 412 carried by the link 406 engages and releases the latch 404 upon upward movement of the link and bail 405. This release will permit the bail 402 to swing to the right under the bias imparted by the springs of the latches 395.

Figure 16:
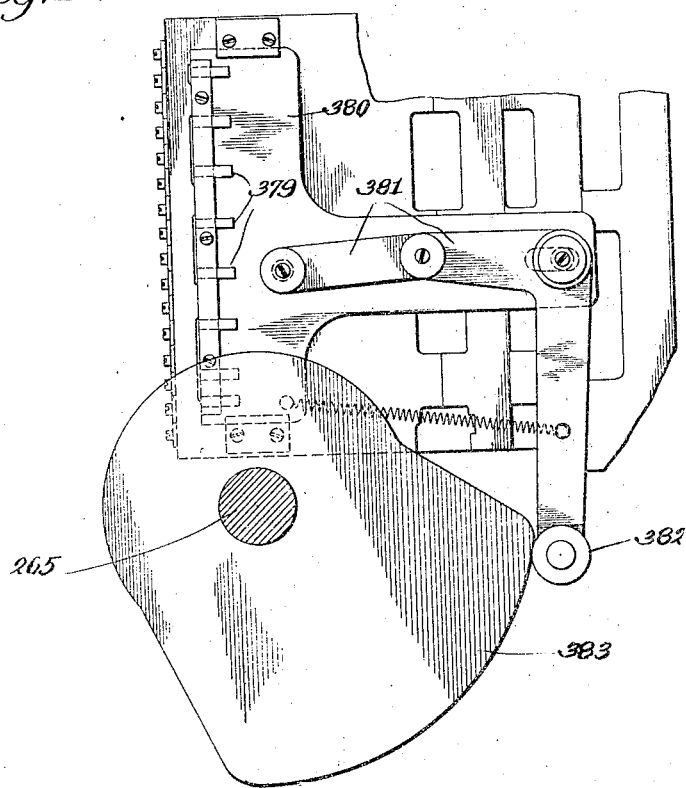
Figs. 16 and 17 are detail views showing certain of the operating devices.

The bails 379, for the feeler bars, are carried by a strip 380 (Fig. 16) which is moved back and forth by means of a toggle device 381 having a follower 382 cooperating with cams 383, one on each side of the machine, on the shaft 265. The two positions of the bails 379 are shown in Figs. 3 and 5.

After any type slug 393 is brought to the printing plane P—P it is impelled against an inking ribbon 420 (see Figs. 3 and 5), disposed in front of a record-receiving card or sheet 116, by means of a hammer 421. The ribbon feeding and reversing devices are not disclosed as they are of conventional form. To drive the type slugs forward, a striking pin 422 is provided, being suitably guided at the printing plane and adapted to be struck by the hammer 421 pivoted on a shaft 423. Fig. 3 shows the position of a hammer 421 prior to printing. Here it is held in cocked position by a latch 424. When the type carrier 385 moves upwardly, the link 426 ascends, swinging the latch 428 into engagement with the hammer lock 424. After the selected type slug has reached the printing plane, the shaft 427 is rocked thereby moving the latch 428 to the right which causes the lock 424 to turn counter-clockwise. This releases the hammer 421 which swings forward under the action of its spring to strike the striking bar 422.

Figure 17:
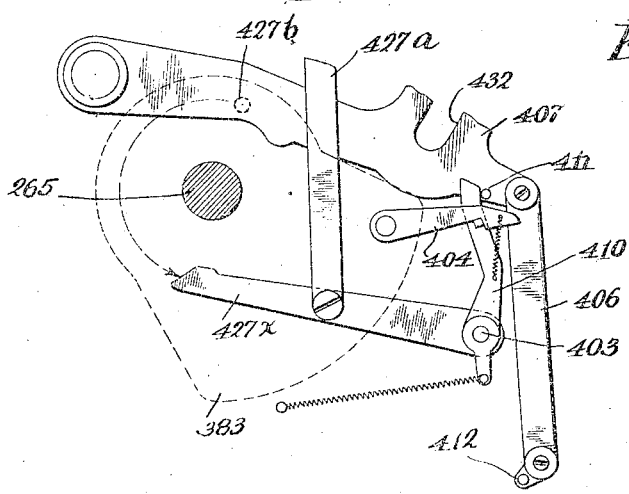

It will be understood that there are a plurality of strikers 422, one for each type carrier, and a corresponding number of hammers 421, etc. The cocking of the various hammers 421 is effected by a common bail 425 which is pivoted upon the shaft 423, which is rocked to restore the hammers by a linkage 430 which extends to a bell crank 431. This bell crank has a follower cooperating with a cam slot 432 in the arm 407. The hammer release shaft 427 is rocked at the proper time in the cycle by a suitable linkage 427ª (Fig. 17) which comprises a part 427ˣ adapted to be engaged and operated by a pin 427ᵇ on the cam 383 on shaft 265.

The cycle of operation will now be understood. When a card field is presented at 100 (Figs. 3 and 5) the perforation sensing elements read the combination arrangements of perforations and effect a corresponding record upon the record-receiving card or sheet 116, through the various instrumentalities disclosed. As thus far described the record is effected by printing at the plane P—P. The machine is of course susceptible to modification in various respects. For example, instead of effecting a printed record on the cards 116, each card 116 may be perforated in accordance with the perforations in a controlling card 100, or both printing and perforating may be effected.

Figure 15:
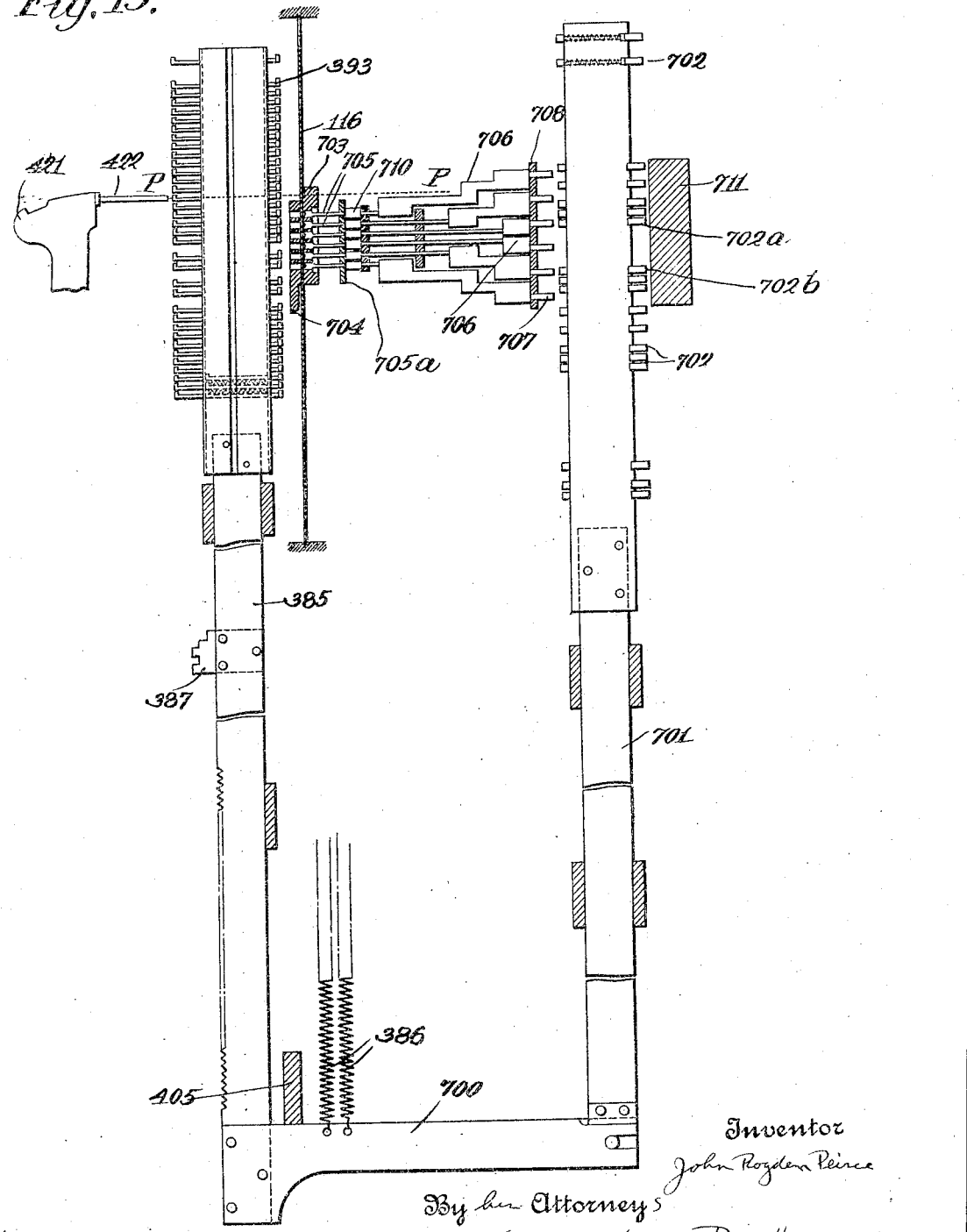
Fig. 15 is a detail elevation illustrating record-effecting mechanism whereby both a printed record and a perforation record may be jointly obtained.

In Fig. 15 I have illustrated an arrangement whereby, when any of the various type slugs 393 is presented at the printing plane P—P, perforating devices are operated to effect a combination arrangement of perforations, representing the particular selected character (see the code in Fig. 2), such perforations being effected in a card 116 vertically below the place at which the character is printed by the selected type slug. To this end each type carrier 385 has connected thereto a corresponding one of cross members 700 in turn connected to a corresponding one of bars 701 slidable in directions parallel to the directions of movement of the type carriers. A description of one of the bars 701 and the punching or perforating mechanism therefor, will suffice for all as they are similar.

The bar 701 carries a plurality of pins 702 each of which is mounted for reciprocation upon said bar in directions at right angles to the line of movement of said bar 701. The pins 702 are biased to the position shown in Fig. 15 by means including compression springs, two of which are shown in dotted lines in Fig. 15. A perforated guide plate 703 and a correspondingly perforated backing plate 704 serve to guide the six punches 705 from the position shown in Fig. 15, through the record-receiving card or sheet 116. Each of these punches has secured thereto a corresponding one of six plates 706, each of which terminates in a corresponding one of six pins 707 slidably mounted in a stationary guide plate 708. The individually movable punches 705 and their plates and pins 707 are moved to the right by means of a restoring bail or plate 705ª. A striking member 711 is movable from the position shown in Fig. 15 to the left, and vice versa so as to operate and release the pins 702. It will be understood that any suitable means may be provided to actuate the member 711 to operate selected ones of the punches 705 during the interval of time when the carriers 385 are being held in elevated position. As soon as the perforating is effected the member 711 is withdrawn.

The parts shown in Fig. 15 are designed to operate as follows. When the carrier 385 is elevated to place any of its slugs at the printing plane, the actuation of the member 711 to the left will operate certain of the pins 707 to advance a combination of punches 705, to effect a combination arrangement of perforations (in the card 116) representing the character (see the code in Fig. 2) printed by the particular slug at the printing plane P—P. For example, in Fig. 15, the carrier 385 is in such position as to place the "U" type slug 393 in the printing plane P—P. This causes the bar 701 to assume the position shown. When the member 711 advances the pins 702ª and 702ᵇ engage and operate the third and fifth pins 707, respectively, and the remaining four pins 707 are not operated at this time. Advance of the third and fifth pins 707 causes advance of the third and fifth punches 705, the remaining four punches 705 remaining in normal position at this time. Advance of the third and fifth punches 705 effects perforations in the third and fifth hole spaces in that column on card 116 which is vertically below the place at which the "U" is printed by the selected type slug. Referring now to Fig. 2 it will be seen that a combination arrangement of perforations in which there is one perforation in the third hole space and another in the fifth hole space, represents or corresponds to the character "U."

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also while it is intended to use the various features and elements in the combination relation described, some of these may be altered, others omitted, and some of the features of each modification embodied in the others without interfering with the more general results outlined, and the invention, within the definition of the following claims extends to such use.

What I claim is:

1. A machine of the class described comprising in combination, means for effecting a plurality of distinctive records representing different characters including the letters of the alphabet, a group of perforation-sensing elements operable in various combinations, the number of elements in said group being the theoretical minimum number required to effect a number of combinations at least as great as the number of distinctive records, and means controlled by different combinations of said elements for selectively determining the various records to be effected by said first named means.

2. A machine as set forth in claim 1 in which the maximum number of perforation-sensing elements employed at any one time selectively to determine the various distinctive records is the theoretical minimum number for the group of elements.

3. A machine as set forth in claim 1 in which the average number of perforation-sensing elements employed to selectively determine the various records is the theoretical minimum number for the group of elements.

4. A machine of the class described comprising in combination, a plurality of perforation-sensing elements, a comb mounted to move from a normal position to any of a plurality of other positions, means controlled by said elements for determining which of three or more positions shall be occupied by said comb, and recording means controlled by said comb.

5. A machine of the class described comprising in combination, a plurality of perforation-sensing elements, a plurality of combs each mounted to move from a normal position to any of a plurality of other positions, means controlled by said elements for determining the relative position of said combs, and recording means controlled by said combs.

6. A machine of the class described comprising in combination, a movable comb, a plurality of perforation-sensing elements, and means intermediate said comb and elements for causing the comb to assume any one of a plurality of positions in accordance with which of said elements is rendered operative.

7. A machine of the class described comprising in combination, a movable comb, a plurality of perforation-sensing elements adapted to respond to various combination arrangements of record perforations, and means intermediate said comb and elements for causing the comb to assume a different one of a plurality of positions in accordance with the operation of any one or a plurality of said elements.

8. A machine of the class described comprising in combination, a plurality of perforation-sensing elements, a comb, recording devices controlled by the position of said comb, and means intermediate said elements and comb for causing said comb to assume any one of a plurality of positions greater in number than the number of the plurality of elements under whose control the comb is positioned.

9. A machine of the class described comprising in combination, a plurality of movable stop members, a lesser number of perforation-sensing elements, means intermediate said members and elements whereby operation of any one or more of said elements determines a corresponding one of a plurality of different set ups of said members, recording devices, and means including a comb controlled by said stop members for controlling said recording devices.

10. A machine of the class described comprising in combination, a plurality of movable stop members, a plurality of perforation-sensing elements, means whereby operation of said elements causes operation of certain of said members, means whereby operation of certain of said members causes operation of certain others of said members, a plurality of combs controlled by said stop members, and recording devices controlled by said combs.

11. A machine of the class described comprising in combination, a perforation-sensing element, a stop member operable thereby, a second perforation-sensing element and a second stop member operable thereby, a third stop member operable by both of said elements, and recording devices controlled by said stop members.

12. A machine of the class described comprising in combination, a perforation-sensing element, a stop member operable thereby, a second perforation-sensing element and a second stop member operable thereby, a third stop member operable by either or both of said elements, and recording devices controlled by said stop members.

13. A machine of the class described comprising in combination, a perforation-sensing element, a stop member operable thereby, a second perforation-sensing element and a second stop member operable thereby, a third stop member operable by either of said elements, and recording devices controlled by said stop members.

14. A machine of the class described comprising in combination, a plurality of perforation-sensing elements, a movable comb, a plurality of stop members greater in number than the number of said elements and each adapted to extend into the path of movement of said comb to determine the position thereof, means responsive to operation of any one of said elements for causing a corresponding one of said stop devices to limit the movement of said comb, means responsive to operation of a plurality of said elements for causing a different one of said stop devices to limit the movement of said member, and recording devices controlled by the position of said member.

15. A machine of the class described comprising in combination, means for effecting a plurality of distinctive records representing at least thirty-four different characters including the letters of the alphabet, a group of six perforation-sensing elements operable in various combinations, means controlled by different combinations of said six elements for selectively determining the various records to be effected by said first named means.

16. A machine as set forth in claim 15, in which not more than three perforation-sensing elements are employed at any one time.

17. A machine of the class described comprising in combination, means for effecting a plurality of distinctive records representing different characters including the letters of the alphabet, a group of six perforations sensing elements operable in various combinations, said combinations including all of the elements taken one at a time and all of the combination of elements taken two at a time, means controlled by different combinations of said six elements for selectively determining the various records to be effected by said first named means.

18. A machine of the class described comprising in combination, means for effecting a plurality of distinctive records representing different characters including the letters of the alphabet and the digits, a group of six perforation-sensing elements operable in various combinations, means controlled by different combinations of said six elements for selectively determining the various records to be effected by said first named means.

19. A machine as set forth in claim 18 in which not more than three perforation-sensing elements are employed at any one time.

20. A machine as set forth in claim 18 in which all of the combinations of elements taken one at a time and all of the combinations of elements taken two at a time are utilized.

21. A machine of the class described comprising in combination, a plurality of perforation-sensing elements, a group of not more than three combs relatively movable in various combinations, means controlled by said elements for determining the relative positions of said combs, means for effecting any one of a plurality of distinctive records each representing a different one of the digits, and means controlled by said combs for selectively determining the particular record to be effected in accordance with the relative position of said combs.

22. A machine of the class described comprising in combination, a plurality of perforation-sensing elements, a group of not more than three combs relatively movable in various combinations, means controlled by said elements for determining the relative positions of said combs, means for effecting any one of a plurality of distinctive records each representing a different letter of the alphabet, and means controlled by said combs for selectively determining the particular record to be effected in accordance with the relative position of said combs.

23. A machine of the class described comprising in combination, a plurality of perforation-sensing elements, a group of not more than three combs relatively movable in various combinations, means controlled by said elements for determining the relative positions of said combs, means for effecting any one of a plurality of distinctive records each representing a different letter of the alphabet or a different one of the digits, and means controlled by said combs for selectively determining the particular record to be effected in accordance with the relative position of said combs.

24. A machine of the class described comprising in combination, a plurality of movable stop members, a plurality of perforation-sensing elements, means whereby operation of said elements causes operation of certain of said members, means whereby operation of certain of said members causes operation of certain others of said members, a plurality of combs each adapted to occupy any one of three or more positions and controlled by said stop members, and recording devices controlled by said combs.

25. A machine of the class described comprising in combination, a plurality of perforation-sensing elements, a plurality of movable combs, a plurality of stop members greater in number than the number of said elements and adapted to extend into the path of movement of said combs to determine the relative position of said combs, means responsive to operation of any one of said elements for causing a corresponding one of said stop elements to limit the movement of a comb, means responsive to operation of a plurality of said elements for causing a different one of said stop devices to limit the movement of a comb, and recording devices controlled by said combs.

26. A card-controlled machine comprising in combination, a group of six perforation-sensing elements, means responsive to operation of various combinations of said six elements taken less than four at a time for effecting any one of a number of different records each corresponding to a different letter of the alphabet, and means responsive to operation of various combinations of four of said elements taken less than three at a time for effecting any one of a number of different records each corresponding to a different one of the digits.

27. A machine of the class described comprising in combination, a plurality of perforation-sensing elements, a lesser number of combs, and means responsive to operation of various combinations of any one or more of said perforation-sensing elements for causing said combs to assume different relative positions.

28. A machine of the class described comprising in combination, means for effecting a plurality of distinctive records representing at least thirty-one different characters including the letters of the alphabet, a group of six perforation sensing elements operable in various combinations, means controlled by different combinations employed, not more than three at any one time, of said six elements for selectively determining the various records to be effected by said first named means.

In testimony whereof I hereunto affix my signature.

JOHN ROYDEN PEIRCE.